Jan. 31, 1961  A. ARUTUNOFF  2,969,742
GAS SEPARATOR FOR SUBMERGIBLE MOTOR-PUMP ASSEMBLIES
Filed July 18, 1958

INVENTOR
Armais Arutunoff
BY
ATTORNEYS

United States Patent Office 2,969,742
Patented Jan. 31, 1961

2,969,742
GAS SEPARATOR FOR SUBMERGIBLE MOTOR-PUMP ASSEMBLIES

Armais Arutunoff, Bartlesville, Okla., assignor to Reda Pump Company, Bartlesville, Okla., a corporation of Delaware Filed July 18, 1958, Ser. No. 749,538

4 Claims. (Cl. 103—113)

This invention relates to a gas separator for electric motor driven submergible pumps and consists more particularly in new and useful improvements in a gas separator unit adapted to be installed between the motor unit and pump unit of a submergible motor-pump assembly, for use in pumping oil wells and the like.

An object of the invention is to provide in a submergible motor-pump assembly, a gas separator unit designed to form an integral part of the assembly, interposed between and connecting the motor unit at the lower end of the assembly with the pump unit located at the upper end of the assembly, with the connecting shaft extending through the separator unit.

Another object of the invention is to provide a gas separator unit for submergible motor-pump assemblies comprising a cylindrical body formed of heavy walled tubing, providing a separator which is mechanically as strong as any other part of the assembly, without requiring additional strengthening elements other than the cylindrical body of the separator itself.

A further object of the invention is to provide in a submergible motor-pump assembly, a separator unit which may be formed of any desired capacity for a given diameter of well, due to its design whereby it can be built of any desired length with any desired number of fluid directing openings for effecting gas separation.

Still another object of the invention is to provide a gas separator of this type including a reservoir for receiving gas freed liquid for delivery to the pump unit and means for minimizing turbulence or pre-rotation of the liquid approaching the delivery passageway to the pump.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a view partially in side elevation and partially in section, illustrating the preferred form of gas separator unit installed in a motor-pump assembly;

Figure 1:
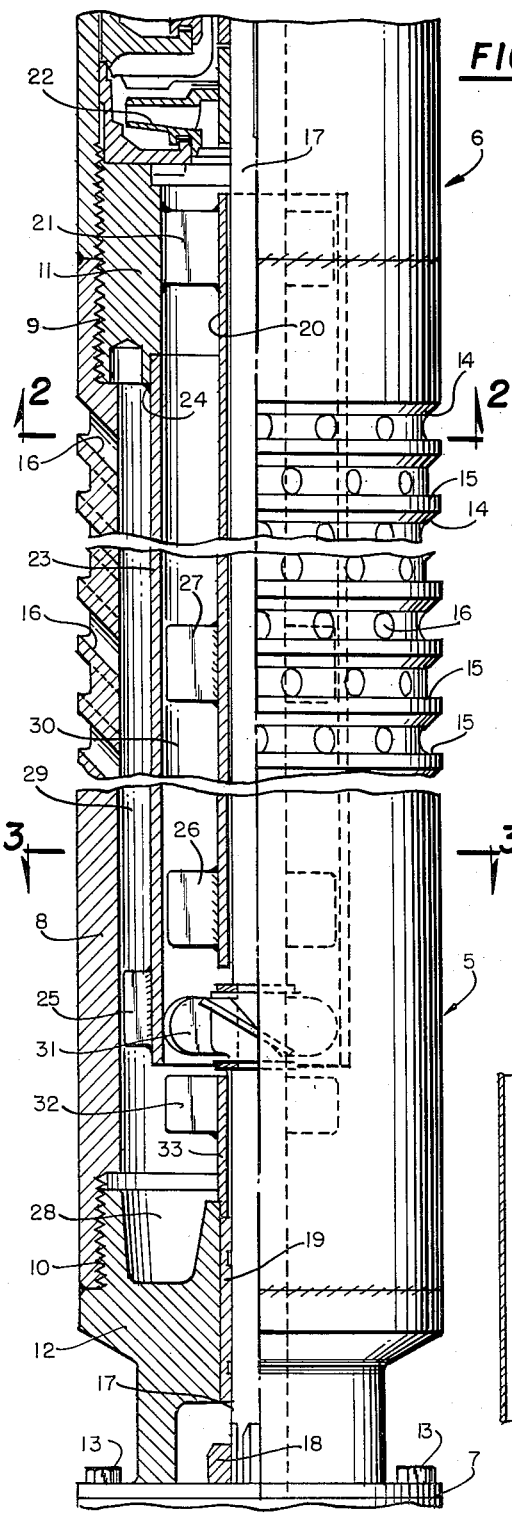
Figure 2:
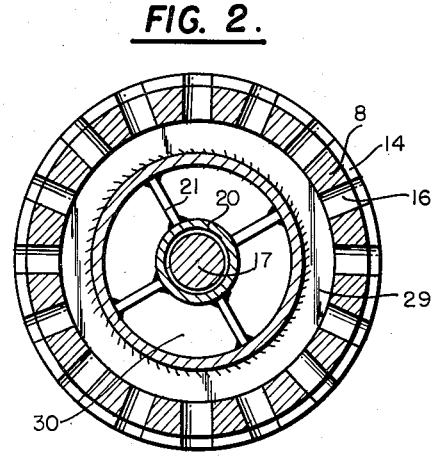
Figure 2 is a transverse sectional view taken on line 2—2 of Figure 1.
Figure 3:
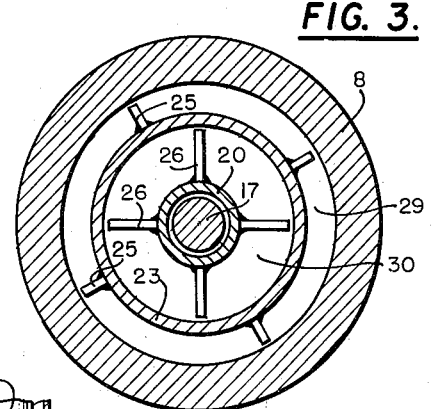
Figure 3 is a similar view taken on line 3—3 of Figure 1.

In the drawings, referring first to Figure 1, the numeral 5 generally represents the gas separator unit which is coaxially interposed between a centrifugal pump unit 6 and a motor unit 7. The separator unit is preferably formed from a heavy wall tube 8 of a diameter conforming to those of the pump unit 6 and the motor unit 7, so that when assembled, it comprises a continuation of the coaxial housings of said pump and motor units and acts as a component part of the motor-pump assembly.

The tube which forms the housing of the separator unit is internally threaded at its opposite extremities as at 9 and 10 to receive respectively, a housing nipple 11 for connection to the housing of the pump unit 6, and a base member 12 by means of which the separator unit is connected to the motor unit 7 through the use of the usual bolts 13. Thus, when installed, the tube or housing 8 of the separator unit 5 becomes an integral part of the motor-pump assembly, and being constructed of heavy wall tube, possesses sufficient strength and rigidity to adequately support not only its own weight but that of the motor unit suspended therefrom.

The upper portion of the housing tube 8 is provided with a series of annular peripheral grooves or recesses 14 forming a corresponding series of annular ledges 15 which are uniformly vertically spaced from one another as will be seen from Figure 1. The tube 8 may be of any desired capacity for a given well diameter, as it may be formed of any desired length and with any desired number of ledges 15, as will later appear.

At the inner extremity or base of each of the recesses 14, the tube is drilled to provide a series of annularly spaced, inwardly and downwardly directed ports or passageways 16 opening at the interior of the tube 8, the ports of adjacent recesses being arranged in alternately spaced or staggered rows. The pump shaft 17 extends concentrically through the separator housing 8 and is splined as at 18 to the motor shaft (not shown). A bushing 19 in the base member 12, embraces the lower end of the pump shaft 17 and the major portion of the shaft from the housing nipple 11 to a point spaced above the base 12, is encircled by a sleeve or guide tube 20 which is suspended from the housing nipple 11 by means of a spider-like device 21 which is welded both to the outer periphery of the sleeve and the inner annular face of the nipple 11. The annular space between the guide tube 20 and the nipple 11 forms a feed passageway communicating with the intake end of the lowermost impeller 22 of the multi-stage centrifugal pump housed in unit 6.

An annular partition or fluid tube 23 is suspended from the lower end of the housing nipple 11, preferably by welding as at 24, and is concentrically spaced from the guide tube 20, forming with said guide tube an inner annular passageway which directs fluid from the lower end of the separator housing 5 to the feed passageway formed in the nipple 11, as will later appear. The lower extremity of the fluid tube 23 which extends downwardly in the separator housing to a point slightly below the lower extremity of the guide tube 20, is provided with a series of radial abutments 25 which are welded to the outer periphery of the fluid tube and serve to center the latter within the separator housing. Similarly, the outer periphery of the guide tube 20 is provided with two sets of radial abutments 26 and 27 which center the guide tube within the fluid tube 23.

As shown in Figure 1, the fluid tube abutments 25 and the guide tube abutments 26 and 27 are welded to the respective supporting tubes but their outer extremities are free so that in assembly, and disassembly, the tube members 20 and 23 may be inserted and withdrawn as a unit with the housing nipple 11 from which they depend.

The lower end of the separator housing 5 below the lowermost ledge 15, and its base 12, form a fluid reservoir 28 which communicates both with the outer annular passageway 29 surrounding the fluid tube 23 and the inner annular passageway 30 defined by the fluid tube 23 and the guide tube 20. The lower or inlet end of the fluid tube 23 houses a pick-up impeller 31, preferably of the screw type mounted on the pump shaft 17 immediately below the lower extremity of the guide tube 20, and in order to prevent pre-rotation or turbulence of the fluid in the reservoir 28, prior to its entrance into the passageway 30 leading to the centrifugal pump unit 6, a series of radial fins 32 are mounted immediately adjacent the inlet end of passageway 30, within the reservoir 28. Preferably these fins 32 comprise a spider-like device welded to a sleeve 33 surrounding the shaft 17 and supported at its lower end in the base 12 above the bushing 19.

Figure 4:
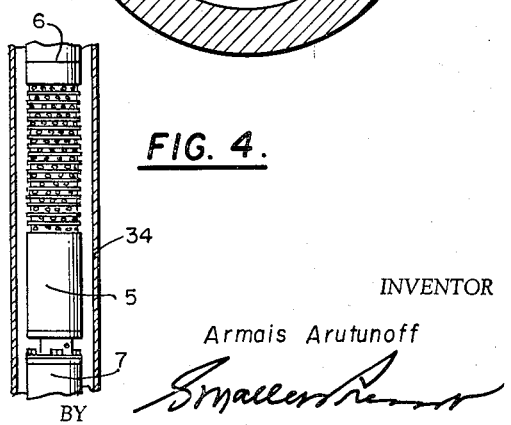
Figure 4 is a reduced side elevational view showing the relationship of the separator unit to the motor and pump units when the assembly is installed in a well casing.

In operation the assembly is lowered in a well casing 34 as shown in Figure 4, with the separator unit 5 interposed between the pump unit 6 above and the motor unit 7 below, the entire string being supported in any conventional manner within the well casing. When the pump unit 6 is set into operation by energizing the motor unit 7, the liquid in the well casing is caused to flow upwardly therein by the action of the centrifugal impellers in the pump unit. The liquid normally contains certain quantities of gas and vapors and as this mixture approaches the perforated ledge area of the separator tube 8, it is caused to abruptly reverse its direction of flow as it enters the series of downwardly inclined passageways 16 in the tube 8. At this point of flow reversal, the gas contained in the mixture is caused to separate out and the liquid travels downwardly through passageway 29 into the reservoir 28 from whence it is directed upwardly by the suction of the pump unit, supplemented by the impeller 31 at the inlet end of the fluid passageway 30. Thus, when the liquid from the well casing enters the inlet end of the pump unit it has been substantially freed of all of its gaseous and vapors content.

It will be apparent that by forming the separator unit 5 of a heavy wall tube of an outside diameter corresponding to that of the pump unit and motor unit and interposing the same between said two units, a mechanically strong assembly is provided without the use of additional strengthening elements. Furthermore, the arrangement described greatly simplifies the manufacture and installation of submergible motor-pump assemblies and reduces maintenance costs to a minimum.

From the foregoing it is believed that my invention may be readily understood by those skilled in the art without further description, it being borne in mind that numerous changes may be made in the details disclosed, without departing from the spirit of the invention as set forth in the following claims.

I claim:

1. A submergible motor-pump assembly, comprising a main pump unit, a cylindrical housing for said pump unit, a gas separator unit having a cylindrical housing suspended from the bottom of said pump housing and forming substantially a coaxial continuation of said pump housing, a coaxial motor unit suspended from the lower end of said separator housing, shaft means extending axially through said separator unit, connecting said motor unit and said pump unit, said separator housing having a bottom closure at its lower end, a plurality of vertically and annularly spaced inlet openings adjacent the upper portion of said separator housing, said openings being abruptly inclined inwardly and downwardly toward said bottom closure, a vertical sleeve in said separator housing coaxial with and spaced radially inwardly from the housing of said separator, said sleeve terminating in an open lower end in axially spaced relation to said bottom closure, and forming an intake conduit for said pump unit, the lower portion of said separator housing together with the lower portion of said sleeve forming a reservoir for said pump unit, and an axial flow-type impeller mounted in the lower portion of said sleeve, whereby said impeller creates a reverse flow of liquid through said inlet openings, to said reservoir and thence to said pump unit, simultaneously releasing entrained gases from said liquid.

2. A submergible motor-pump assembly as claimed in claim 1, wherein the wall of said separator housing is relatively thick, said inclined inlet openings extending diagonally therethrough to thereby increase the reverse liquid flow and gas liberation.

3. A submergible motor-pump assembly as claimed in claim 1, including baffle means adjacent the open lower end of said intake conduit to prevent pre-rotation of the liquid in said reservoir approaching said conduit.

4. A submergible motor-pump assembly, comprising a pump unit, a cylindrical housing for said pump unit, a gas separator unit having a cylindrical housing, a nipple connecting said pump housing and separator housing and suspending the latter from the bottom of said pump housing to form a coaxial continuation of said pump housing, a coaxial motor unit suspended from the lower end of said separator housing, shaft means extending axially through said separator unit, connecting said motor unit to said pump unit, said separator housing having a bottom closure at its lower end, a plurality of vertically and annularly spaced inlet openings adjacent the upper portion of said separator housing, said openings being abruptly inwardly and downwardly inclined toward said bottom closure, a first vertical sleeve in said separator housing, coaxial with and spaced radially inwardly from the housing of said separator, said first sleeve terminating in an open lower end in axially spaced relation to said bottom closure, and forming with the lower portion of said separator housing, a reservoir for said pump unit, a second vertical sleeve in said separator housing surrounding said shaft means in radially inwardly spaced relation to said first sleeve and forming therewith an annular intake conduit for said pump unit, in communication with said reservoir, radial spacing abutments secured to the outer periphery of each sleeve and freely engageable at their outer ends with the adjacent inner peripheries of said separator housing and first sleeve respectively, said sleeves being suspended from said nipple and removable as a unit therewith, from said separator housing.

References Cited in the file of this patent

UNITED STATES PATENTS

| | | |
|---|---|---|
| 1,452,253 | Nevitt | Apr. 17, 1923 |
| 2,104,339 | Arutunoff | Jan. 4, 1938 |
| 2,491,587 | Seago | Dec. 20, 1949 |
| 2,517,198 | Gilbert | Aug. 1, 1950 |
| 2,648,286 | Bergh | Aug. 11, 1953 |
| 2,670,686 | Bergh | Mar. 2, 1954 |
| 2,737,897 | Dewees | Mar. 13, 1956 |
| 2,816,509 | Rice | Dec. 17, 1957 |

FOREIGN PATENTS

| | | |
|---|---|---|
| 372,145 | France | Feb. 13, 1907 |
| 543,770 | Germany | Feb. 9, 1932 |
| 714,238 | Germany | Nov. 26, 1941 |
| 739,007 | Germany | Sept. 8, 1943 |